(12) United States Patent
Chacon et al.

(10) Patent No.: US 10,167,849 B2
(45) Date of Patent: Jan. 1, 2019

(54) WIND TURBINE CONTROL USING SECONDARY CONTROLLER TO ADJUST WIND SPEED AND/OR DIRECTION INPUT VALUES

(71) Applicant: General Electric Company, Schenectady, NY (US)

(72) Inventors: Joseph Lawrence Chacon, Greenville, SC (US); William Earl Fish, Amsterdam, NY (US); Noah Pennington, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 730 days.

(21) Appl. No.: 14/811,945

(22) Filed: Jul. 29, 2015

(65) Prior Publication Data

US 2017/0030332 A1    Feb. 2, 2017

(51) Int. Cl.
*F03D 7/02* (2006.01)
*F03D 7/04* (2006.01)
*F03D 17/00* (2016.01)

(52) U.S. Cl.
CPC ......... *F03D 7/0276* (2013.01); *F03D 7/0204* (2013.01); *F03D 7/047* (2013.01); *F03D 17/00* (2016.05); *F05B 2230/80* (2013.01); *F05B 2270/32* (2013.01); *F05B 2270/321* (2013.01); *Y02E 10/723* (2013.01); *Y02P 70/523* (2015.11)

(58) Field of Classification Search
CPC ...... F03D 17/00; F03D 7/0204; F03D 7/0276; F03D 7/047; F05B 2230/80; F05B 2270/32; F05B 2270/321; Y02E 10/723; Y02P 70/523

USPC .......... 702/92, 96, 127, 142; 290/44; 416/1, 416/31, 36; 700/286
See application file for complete search history.

(56) References Cited

U.S. PATENT DOCUMENTS 8,430,632 B2   4/2013 Haag
8,434,360 B2   5/2013 Cheng
(Continued)

FOREIGN PATENT DOCUMENTS

| EP | 2458204 A1 | 5/2012 |
| EP | 2631471 A1 | 8/2013 |
| WO | 2009071882 A2 | 6/2009 |

OTHER PUBLICATIONS

European Search Report and Opinion issued in connection with corresponding EP Application No. 16181004.9 dated Nov. 28, 2016.

*Primary Examiner* — John H Le
(74) *Attorney, Agent, or Firm* — Dority & Manning, P.A.

(57) ABSTRACT

A system for controlling a wind turbine may include at least one sensor configured to provide at least one of a wind speed signal or a wind direction signal and a turbine controller configured to control the operation of the wind turbine. The system may also include a secondary controller inserted between the sensor(s) and the turbine controller. The secondary controller may be separated from the turbine controller by a distance and may be configured to receive the wind speed signal and/or the wind direction signal from the sensor(s) over a communication interface. In addition, the secondary controller may be configured to adjust the wind speed signal and/or wind direction signal based at least in part on a signal bias value(s) to an adjusted signal(s) and to provide the adjusted signal(s) to the turbine controller.

20 Claims, 7 Drawing Sheets

(56) References Cited

U.S. PATENT DOCUMENTS

| | | |
|---|---|---|
| 8,803,352 B1 | 8/2014 | Koerber et al. |
| 2011/0309621 A1 | 12/2011 | Nielsen et al. |
| 2012/0061965 A1* | 3/2012 | Khedekar ............... F03D 3/005 290/44 |
| 2013/0193686 A1 | 8/2013 | Perley et al. |
| 2016/0265510 A1* | 9/2016 | Chacon ................ F03D 7/0224 |

* cited by examiner

WIND TURBINE CONTROL USING SECONDARY CONTROLLER TO ADJUST WIND SPEED AND/OR DIRECTION INPUT VALUES

FIELD OF THE INVENTION

The present subject matter relates generally to wind turbines and more particularly to systems and methods for adjusting wind speed and/or wind direction readings for a wind turbine controller to improve energy production.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, components of the wind turbine are subjected to various loads due to the aerodynamic wind loads acting on the blades. Blade loading is dependent on the wind speed, the tip speed ratio and/or the pitch setting of the blades. Tip speed ratio is the ratio of the rotational velocity of the blade tip to wind speed. It can be desirable to adjust operation of the wind turbine based on signals indicative of tip speed ratio (e.g. various speed readings) to adjust loading of the rotor blades of the wind turbine and/or to increase energy production of the wind turbine.

To reduce rotor blade loading, various methods and apparatus have been developed to allow the rotor blades to shed a portion of the loads experienced thereby. Such methods and apparatus include, for example, pitching the rotor blades and/or reducing generator torque during operation. Accordingly, many wind turbines include a wind turbine controller that can operate the wind turbine in various ways based on the wind turbine loading. For instance, under various operating conditions, the wind turbine can adjust the torque of a generator and/or the pitch angle of the rotor blades to adjust the tip speed ratio to meet a desired tip speed ratio setpoint to increase energy capture by the wind turbine.

In certain instances, it can be desirable to adjust the performance of the wind turbine controller to increase or enhance energy production. However, in some cases, it may be difficult to adjust the operation of turbine controller itself. For instance, the computer-readable instructions (e.g. source code) implemented by the turbine controller in executing various control routines may not be accessible or otherwise capable of being modified.

Accordingly, systems and methods for adjusting the operation of a turbine control system without requiring access or modification of computer-readable instructions implemented by the turbine controller would be welcomed in the technology.

BRIEF DESCRIPTION OF THE INVENTION

Aspects and advantages of embodiments of the present disclosure will be set forth in part in the following description, or may be learned from the description, or may be learned through practice of the embodiments.

In one aspect, the present subject matter is directed to a system for controlling a wind turbine. The system may include at least one sensor configured to provide a wind speed signal indicative of a wind speed experienced by the wind turbine and a turbine controller configured to control the operation of the wind turbine. The system may also include a secondary controller inserted between the sensor(s) and the turbine controller. The secondary controller may be separated from the turbine controller by a distance and may be configured to receive the wind speed signal from the sensor(s) over a communication interface. In addition, the secondary controller may be configured to adjust the wind speed signal based at least in part on a signal bias to an adjusted wind speed signal and to provide the adjusted wind speed signal to the turbine controller.

In another aspect, the present subject matter is directed to a system for controlling a wind turbine. The system may include at least one sensor configured to provide a wind direction signal indicative of a wind direction relative to the wind turbine and a turbine controller configured to control the operation of the wind turbine. The system may also include a secondary controller inserted between the sensor(s) and the turbine controller. The secondary controller may be separated from the turbine controller by a distance and may be configured to receive the wind direction signal from the sensor(s) over a communication interface. In addition, the secondary controller may be configured to adjust the wind direction signal based at least in part on a signal bias to an adjusted wind direction signal and to provide the adjusted wind direction signal to the turbine controller.

In a further aspect, the present subject matter is directed to a method for controlling a wind turbine, wherein the wind turbine includes first and second sensors in communication with a wind turbine controller over a signal path. The method may generally include modifying the signal path between the wind turbine controller and the first and second sensors, inserting a secondary controller between the wind turbine controller and the first and second sensors, generating a wind speed signal indicative of a wind speed experienced by the wind turbine with the first sensor, generating a wind direction signal indicative of a wind direction relative to the wind turbine with the second sensor, determining, at the secondary controller, an adjusted wind speed signal that is different from the wind speed signal based at least in part on a first signal bias, determining, at the secondary controller, an adjusted wind direction signal that is different from the wind direction signal based at least in part on a second signal bias and providing the adjusted wind speed and wind direction signals to the wind turbine controller.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for adjusting the operation of a wind turbine control system based on various signals received from sensors (e.g. wind-related sensors) configured to monitor various wind-related parameters. For instance, the disclosed system may include a turbine controller configured to receive various signals indicative of wind-related parameters, such as the wind speed and/or the wind direction. These signals may be used by the wind turbine controller to control the operation of the wind turbine. For instance, the wind speed signal(s) may be used to determine a tip-speed ratio setpoint for the wind turbine and to adjust the operation of the wind turbine, for instance, by adjusting a pitch angle of one or more of the rotor blades and/or by adjusting the generator torque. Similarly, the wind direction signal(s) may be used to adjust a yaw angle associated with the wind turbine in order to properly position the nacelle relative to the direction of the wind.

In some cases, it may be desirable to modify the operation of the turbine controller in response to these wind-related signals to further increase or enhance the energy production of the wind turbine. However, as indicated above, it can be difficult in some cases to access programming (e.g. computer-readable instructions such as source code and source parameters) associated with the turbine controller to make such adjustments.

Thus, in accordance with several aspects of the present subject matter, the disclosed system may include a secondary controller provided at the wind turbine. The secondary controller may be external to the wind turbine controller and/or may be separated from the turbine controller by a distance. In example embodiments, the secondary controller may be inserted between the turbine controller and the one or more sensors configured to generate the wind-related signals. The secondary controller may also be configured to receive one or more additional inputs, such as signals indicative of the power output (e.g. kilowatts) of the wind turbine, and may determine an adjustment to the wind-related signal(s) based at least in part on the received input(s). The adjusted wind-related signal(s) may then be transmitted to the turbine controller and used by such controller to control operation of the wind turbine.

For instance, in one embodiment, the secondary controller may be configured to adjust a wind speed signal received from a wind speed sensor based at least in part on a wind speed signal bias determined by the second controller. The adjusted wind speed signal may then be transmitted to the wind turbine controller for controlling the operation of the wind turbine. In addition to adjusting the wind speed signal (or as an alternative thereto), the secondary controller may also be configured to adjust a wind direction signal received from a wind direction sensor based at least in part on a wind direction signal bias determined by the second controller. The adjusted wind direction signal may then be transmitted to the wind turbine controller for controlling the operation of the wind turbine.

As indicated above, the wind turbine controller may use the adjusted signal(s) to control the operation of the wind turbine. For instance, the adjusted wind speed signal may be used by the wind turbine controller to determine a tip speed ratio setpoint for the wind turbine. The wind turbine controller may then adjust the loading of one or more of the rotor blades based at least in part on the tip speed ratio setpoint to achieve the desired tip speed ratio for increased energy production. For instance, the wind turbine controller may adjust the pitch angle of one or more of the rotor blades and/or adjust a generator torque based at least in part on the tip speed ratio setpoint. Similarly, the adjusted wind direction signal may be used by the wind turbine controller to determine a yaw angle setpoint for the wind turbine. The wind turbine controller may then adjust the actual yaw angle of the nacelle based on the yaw angle setpoint to alter the orientation of the nacelle relative to the wind. In this way, a tip speed ratio setpoint and/or a yaw angle setpoint implemented by the controller can effectively be adjusted by the secondary controller without requiring access to or modification of the computer-readable instructions associated with the turbine controller as a result of different wind speed/direction readings (e.g. the adjusted wind speed/direction signals) triggering different operational conditions of the wind turbine.

In example implementations, each adjusted signal may be determined to achieve energy production improvement using a signal bias. As will be described below, the signal bias may be different for various input conditions. The input conditions may be based on, for instance, various wind speeds, wind directions and/or power outputs associated with the wind turbine. For instance, a first signal bias may be used for wind speeds below a certain wind speed threshold while a second signal bias may be used for wind speeds above the wind speed threshold. The different signal biases for each input condition may be stored in a look-up table, matrix, or other correlation stored in a memory at the secondary controller.

The signal bias for each of the input conditions may be programmed into the secondary controller in various ways. In example embodiments, the wind speed signal bias and/or the wind direction signal bias may be automatically determined when the secondary controller is integrated into the wind turbine control system using an auto-tuning process. For instance, for each of a plurality of input conditions, the secondary controller may incrementally adjust the signal bias among a plurality of incremental values. The secondary controller may monitor various inputs to determine which incremental signal bias provides the greatest or a sufficiently greater improvement in energy production for the particular input condition. This incremental signal bias can be selected as the signal bias for the particular input condition.

Figure 1:
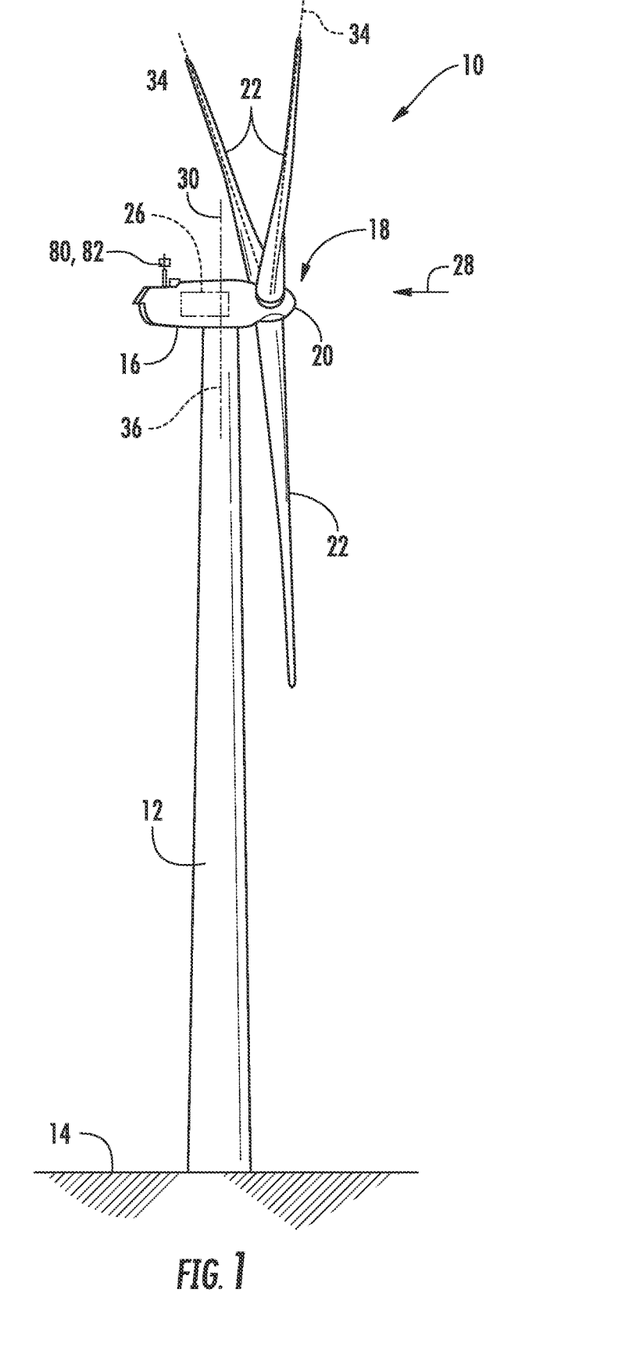
FIG. 1 illustrates a side view of one embodiment of a wind turbine.

Referring now to FIG. 1, a side view of one embodiment of a wind turbine 10 is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system including a turbine controller 26 housed within the nacelle 16 or somewhere else associated with the wind turbine 10. In general, the turbine controller 26 may comprise one or more processing devices. Thus, in several embodiments, the turbine controller 26 may include suitable computer-readable instructions that, when executed by one or more processing devices, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10.

For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32.

Further, as the direction 28 of the wind changes, the turbine controller 26 may be configured to control a yaw direction or angle of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism(s) 38 (FIG. 2) of the wind turbine 10 such that the nacelle 16 may be rotated about the yaw axis 36.

Still further, the turbine controller 26 may also be configured to control the torque of the generator 24 (FIG. 2) of the wind turbine 10. For example, the turbine controller 26 may be configured to transmit control signals/commands to the generator 24 in order to modulate the magnetic flux produced within the generator 24, thus adjusting the torque demand on the generator 24. Such temporary de-rating of the generator 24 may reduce the rotational speed of the rotor blades 22, thereby reducing the aerodynamic loads acting on the blades 22 and the reaction loads on various other wind turbine 10 components.

Figure 2:
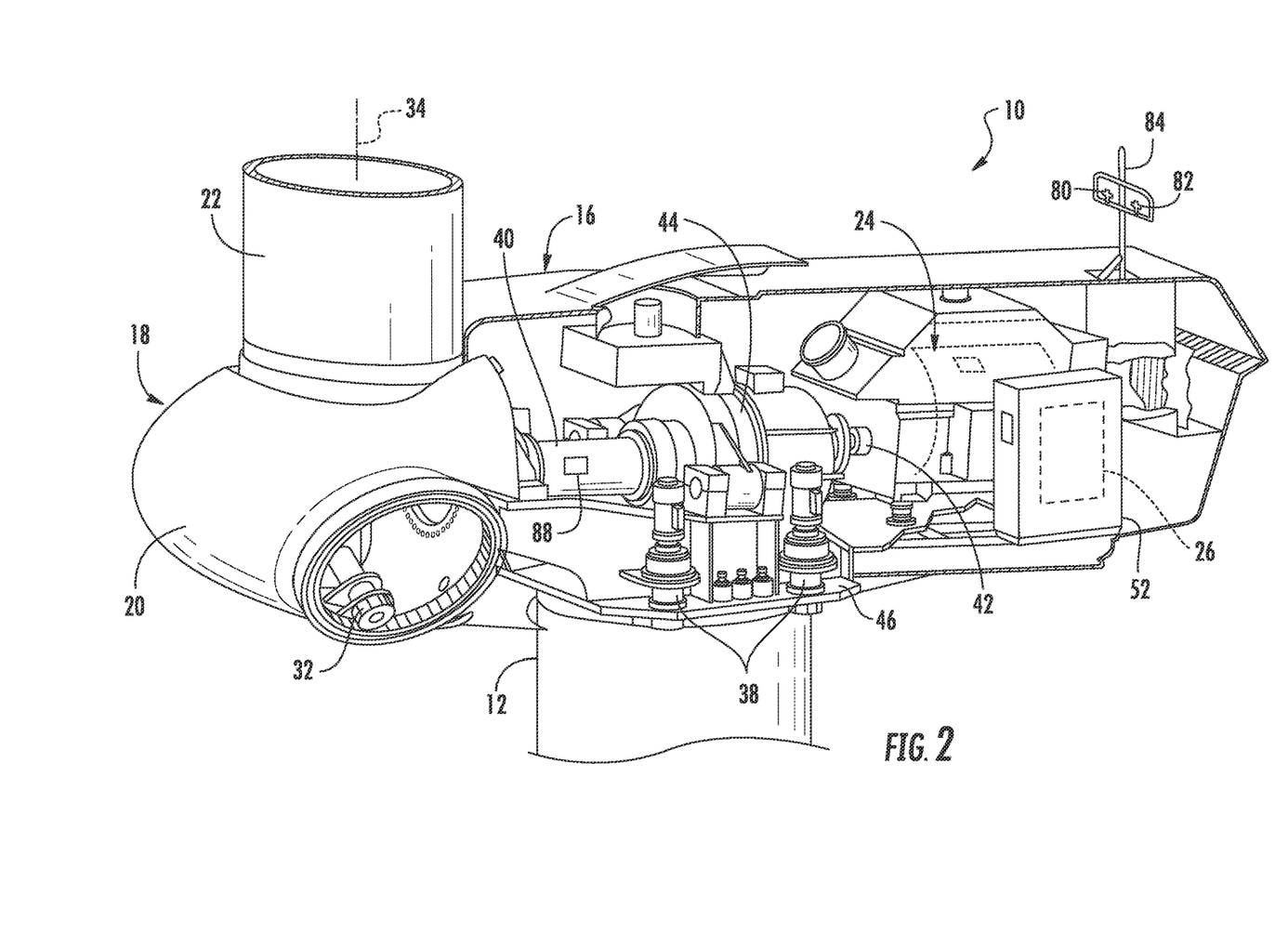
FIG. 2 illustrates a perspective, internal view of one embodiment of a nacelle suitable for use with the wind turbine shown in FIG. 1.

Referring now to FIG. 2, a simplified, internal view of one embodiment of the nacelle 16 of the wind turbine 10 shown in FIG. 1 is illustrated in accordance with aspects of the present subject matter. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks mounted to the bedplate 46.

Additionally, as indicated herein, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described herein, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw angle of the nacelle 16 relative to the direction 28 (FIG. 1) of the wind. Similarly, the turbine controller 26 may also be communicatively coupled to each pitch adjustment mechanism 32 of the wind turbine 10 (one of which is shown) for controlling and/or altering the pitch angle of each rotor blade 22. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

The wind turbine 10 may also include one or more sensors for monitoring one or more operating conditions of the turbine 10. For instance, as shown in FIG. 2, the wind turbine may include one or more wind-related sensors 80, 82 for monitoring one or more wind-related parameters of the wind turbine 10. Specifically, in several embodiments, the wind turbine 10 may include one or more wind speed sensors 80 for monitoring the wind speed experienced by the wind turbine 10 and one or more wind direction sensors 82 for monitoring the wind direction relative to the wind turbine 10. As shown in FIG. 2, the wind sensors 80, 82 are coupled to or otherwise form part of a Meteorological tower 84 (also referred to as a met tower or met mast). In other embodiments, the wind speed sensor(s) 80 and/or the wind direction sensor(s) 82 need not be coupled to or form part of a Meteorological tower 84 but, rather, may be positioned at any suitable location on, within and/or relative to the wind turbine 10 that allows such sensor(s) to monitor its corresponding wind-related parameter.

It should be appreciated that the wind speed sensor(s) 80 may generally correspond to any suitable sensor that provides an indication of the current wind speed being experienced by the wind turbine 10. For instance, suitable wind speed sensors may include, but are not limited to, Light Detection and Ranging ("LIDAR") devices, Sonic Detection and Ranging ("SODAR") devices, anemometers, barometers, and radar devices (such as Doppler radar devices). In other embodiments, one or more sensors may be utilized to measure the deflection of the rotor blades 22. This deflection may then be correlated to the wind speed to which the rotor blades 22 are subjected. Similarly, it should be appreciated that wind direction sensor(s) 82 may generally correspond to any suitable sensor that provides an indication of the current wind direction relative to the wind turbine 10. For example, a suitable wind direction sensor may correspond to a wind vane.

It should also be appreciated that, although the wind speed and wind direction sensors 80, 82 are shown in FIG. 2 as two separate sensors, the wind turbine 10 may, instead, include a single sensor or sensing device configured to monitor both the wind speed and the wind direction.

Additionally, the wind turbine 10 may also include any other suitable sensors. For instance, as shown in FIG. 2, the wind turbine 10 may include a speed sensor 88 for monitoring the rotor speed of the wind turbine 10. In such an embodiment, the speed sensor 88 may be configured to monitor the speed of any suitable component of the wind turbine 10 that provide an indication of the rotor speed, such as by monitoring the speed of the rotor shaft 40 or the generator shaft 42 of the wind turbine 10. It should be appreciated that the speed sensor 88 may correspond to any suitable sensor(s) or component(s) for measuring speed, such as one or more encoders, proximity sensors, transducers, resolvers, or the like.

Example aspects of the present disclosure are further directed to methods for controlling a wind turbine 10 based on wind-related signals, for instance, by determining a tip speed ratio setpoint of the wind turbine 10 based on a wind speed signal and/or by determining a yaw angle setpoint based on a wind direction signal. As is generally understood, the tip speed ratio is the ratio of the rotational velocity of the blade tip to wind speed. The tip speed ratio of the wind turbine 10 may be determined, for instance, based at least in part on various speed signals provided by the speed sensor(s) 88 indicative of the speed of various components (e.g. shafts, rotor blades, etc.) of the wind turbine 10 as well as signals indicative of the wind speed (e.g. from the wind speed sensors 80). For instance, the tip speed ratio may generally be calculated by multiplying the current rotational speed of the wind turbine 10 as measured by a speed sensor 88 by the maximum radius of the rotor 18, and dividing this result by the wind speed. As will be described below, the controller 26 may be utilized to control the torque adjustment of the generator 24, the pitch adjustment of the rotor blades 22 and/or the yaw adjustment of the nacelle 16 based on the subject matter disclosed herein in order to control loading on the rotor blades 22 and the wind turbine 10 in general to increase energy production.

Figure 3:
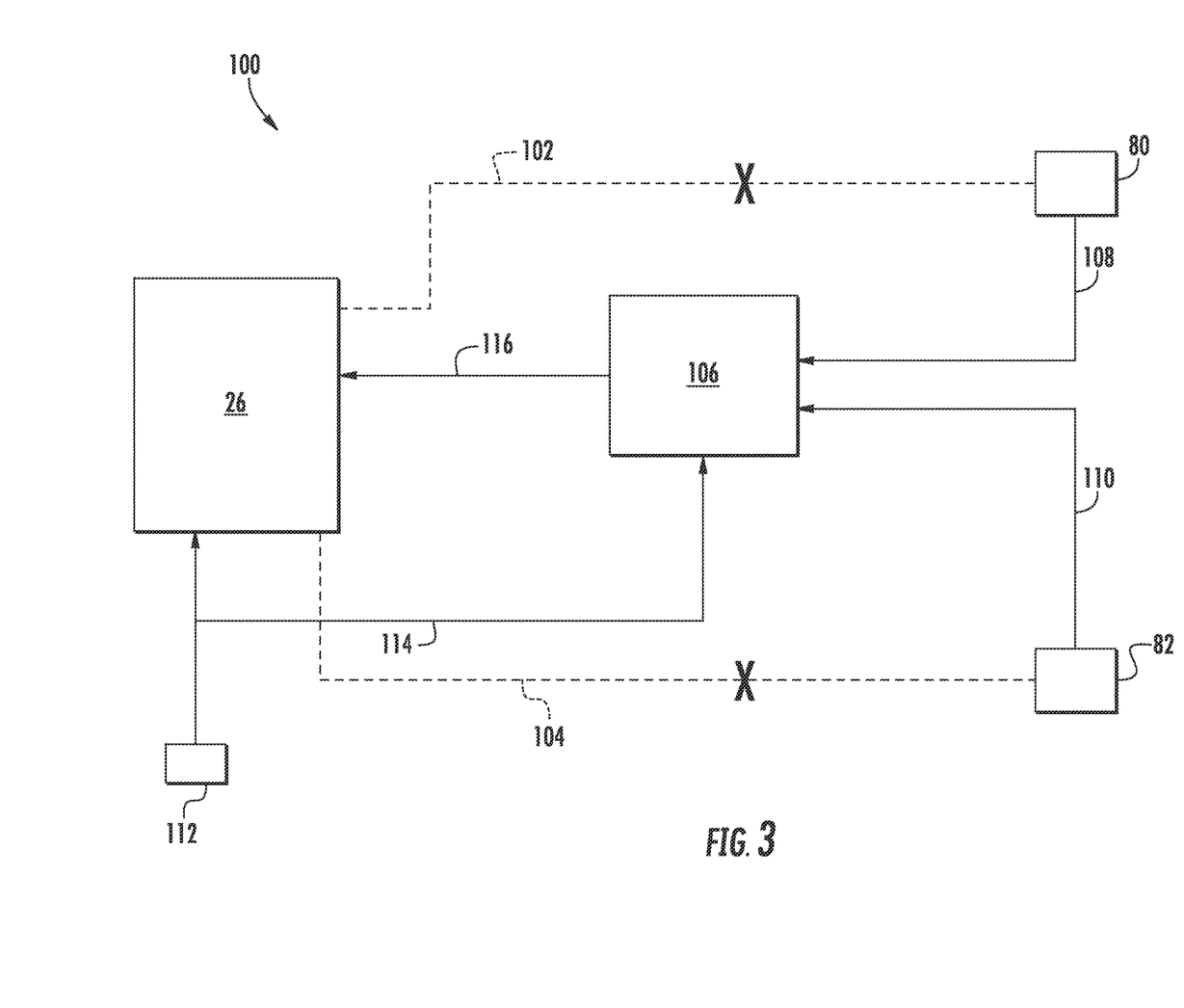
FIG. 3 illustrates a schematic view of one embodiment of a control system for controlling the operation of a wind turbine in accordance with aspects of the present subject matter.

Referring now to FIG. 3, a schematic view of one embodiment of a control system 100 for a wind turbine, such as the wind turbine 10 shown FIG. 1, is illustrated in accordance with aspects of the present subject matter. As shown, the control system 100 includes the wind turbine controller 26. As indicated above, the turbine controller 26 may include computer-readable instructions that, when executed by one or more processors, cause the processor(s) to implement various control routines, such as determining a tip speed ratio setpoint and controlling loading of the wind turbine 10 based on such setpoint and/or determining a yaw angle setpoint and adjusting the yaw angle of the nacelle 16 based on such setpoint. In some embodiments, the computer-readable instructions associated with the turbine controller 26 may be inaccessible or otherwise unavailable. For instance, the turbine controller 26 may have been installed and/or configured by a different service provider.

The control system 100 may also include one or more wind-related sensors 80, 82. For instance, as indicated above, the wind turbine 10 may include one or more wind speed sensors 80 and one or more wind direction sensors 82. In such instance, such sensors 80, 82 may be included within embodiments of the disclosed control system 100.

To adjust the operation of the turbine controller 26 without requiring access to the computer-readable instructions associated with the controller 26, signal paths 102 and 104 for communicating wind speed signals from the wind speed sensor(s) 80 and for communicating wind direction signals from the wind direction sensor(s) 82, respectively, may be broken. In addition, a secondary controller 106 of the control system 100 may be inserted in a new signal path between the wind turbine controller 26 and the wind sensors 80, 82.

The secondary controller 106 may be separated from the wind turbine controller 26 by a distance (e.g. 1 m, 1 cm or less, 2 m or more, or other suitable distance). In addition, the secondary controller 106 may be located in a separate housing and/or may include one or more components (e.g. processors, memory devices, etc.) that are different from the components of the wind turbine controller 26. Additionally, in some embodiments, the secondary controller 106 may use different computer-readable instructions stored in a different language or protocol relative to the turbine controller 26. In this way, the secondary controller 106 may be a standalone and separate device from the turbine controller 26.

The secondary controller 106 may be configured to receive wind speed signals from the wind speed sensor 80 via a signal path 108. The secondary controller 106 may also be configured to receive wind direction signals from the wind direction sensor 82 via a signal path 110. As used herein, a signal path can include any suitable communication medium for transmitting signals. For instance, a signal path can include any number of wired or wireless links, including communication via one or more Ethernet connections, fiber optic connections, network buses, power lines, conductors, or circuits for transmitting information wirelessly. Signals can be communicated over a signal path using any suitable communication protocol, such as a serial communication protocol, broadband over power line protocol, wireless communication protocol, or other suitable protocol.

The secondary controller 106 may also receive one or more signals associated with one or more other input conditions for the wind turbine 10 (e.g., one or more conditions other than the current wind speed and/or the current wind direction). For instance, in one embodiment, such additional input condition(s) may be representative of the power production for the wind turbine 10 and/or of other suitable turbine-related parameters. For example, the secondary controller 106 may receive a signal from a power-related sensor 112 over signal path 114. The power-related sensor 102 may be a sensor associated with the electrical system of the wind turbine 10 that provides signals indicative of the power production of the wind turbine 10 (e.g., the power output of the wind turbine 10).

In several embodiments, the secondary controller 106 may be configured to adjust a wind speed signal received from the wind speed sensor 80 to an adjusted wind speed signal based on a wind speed signal bias. The wind speed signal bias may range, for instance, from about 0.5 meter/second (m/s) to about 1 m/s. The adjusted wind speed signal may then be determined, for instance, by adding or subtracting the wind speed signal bias from the wind speed signal received from the wind speed sensor 80. Similarly, the secondary controller 106 may be configured to adjust the wind direction signal received from the wind direction sensor 82 to an adjusted wind direction signal based on a wind direction signal bias. The wind direction signal bias may range, for instance, from about 5 degrees to about 10 degrees. The adjusted wind direction signal may then be determined, for instance, by adding or subtracting the wind direction signal bias from the wind direction signal received from the wind direction sensor 82.

In particular implementations, the secondary controller 106 may be configured to determine an adjusted wind speed signal and/or an adjusted wind direction signal based at least in part on one or more of the current input conditions for the wind turbine, such as the current wind speed, the current wind direction and/or the current power output (e.g., as determined from, the signals received from the power-related sensor 102). For instance, different signal bias values may be associated with different input conditions. The signal bias values for each input condition (or combination of input conditions) may be determined, in one embodiment, using an auto-tuning process. Example methods for programming different signal bias values for different input conditions into the secondary controller 106 will be discussed in more detail below.

Once determined, the adjusted wind speed signal and/or the adjusted wind direction signal may be communicated by the secondary controller 106 to the turbine controller 26 over signal path 116. The turbine controller 26 may then use the adjusted signals to control the operation of the wind turbine 10. For instance, in some embodiments, the turbine controller 26 may calculate a tip speed ratio setpoint based on the adjusted wind speed signal, a radius of the rotor blades 22, and a signal indicative of the rotor speed as determined, for instance, using the speed sensor 88 (FIG. 2). The turbine controller 26 may then be configured to adjust operation of the wind turbine 10 based at least in part on the tip speed ratio setpoint, for instance, by pitching the rotor blades 22 and/or adjusting the torque of the generator 24. Similarly, the turbine controller 26 may calculate a yaw angle setpoint based on the adjusted wind direction signal. The turbine controller 26 may then be configured to adjust the operation of the wind turbine 10 based at least in part on the yaw angle setpoint, for instance, by yawing the nacelle 16.

Figure 4:
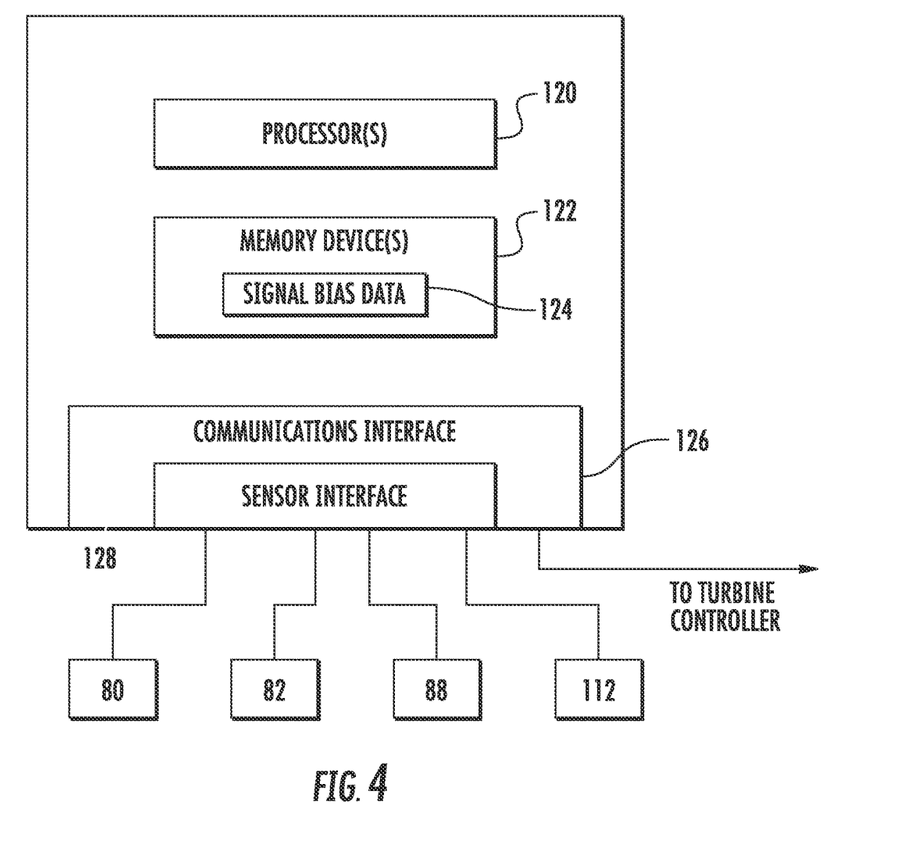
FIG. 4 illustrates a schematic view of one embodiment of a secondary controller for a wind turbine in accordance with aspects of the present subject matter.

Referring now to FIG. 4, there is illustrated a block diagram of one embodiment of suitable components that may be included within the secondary controller 106 (or the turbine controller 26) in accordance with example aspects of the present disclosure. As shown, the secondary controller 106 may include one or more processor(s) 120 and associated memory device(s) 122 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 122 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 122 may generally be configured to store suitable computer-readable instructions that, when implemented by the processor(s) 120, configure the secondary controller 106 to perform various functions including, but not limited to, receiving directly or indirectly signals from one or more sensors (e.g. the wind speed sensor(s) 80, the wind direction sensor(s) 82, the speed sensor(s) 88 and/or the power-related sensor(s) 112) indicative of various input conditions, determining adjusted wind speed/direction signals, and/or transmitting the adjusted signals to the turbine controller 26, and various other suitable computer-implemented functions.

As illustrated, the memory device(s) 122 may also store signal bias data 124. The signal bias data 124 may correspond to one or more signal bias values that can be used to offset or adjust the wind speed signal and/or the wind direction signal received from the wind-related sensor(s) 80, 82 to determine the adjusted signal(s). In particular implementations, the signal bias data 124 may include a different signal bias value associated with each of a plurality of different input conditions. The signal bias data 124 may be programmed into the memory device(s) 122 in any suitable manner. In one example embodiment, the signal bias data 124 may be automatically programmed into the memory device(s) 122 using an auto-tuning process as will be discussed in more detail below.

Additionally, the secondary controller 106 may also include a communications interface 126 to facilitate communications between the secondary controller 106 and the various components of the wind turbine 10. An interface can include one or more circuits, terminals, pins, contacts, conductors, or other components for sending and receiving control signals. Moreover, the secondary controller 106 may also include a sensor interface 128 (e.g., one or more analog-to-digital converters) to permit signals transmitted from the sensors (e.g. sensors 80, 82, 88, 112) to be converted into signals that may be understood and processed by the processor(s) 120.

Figure 5:
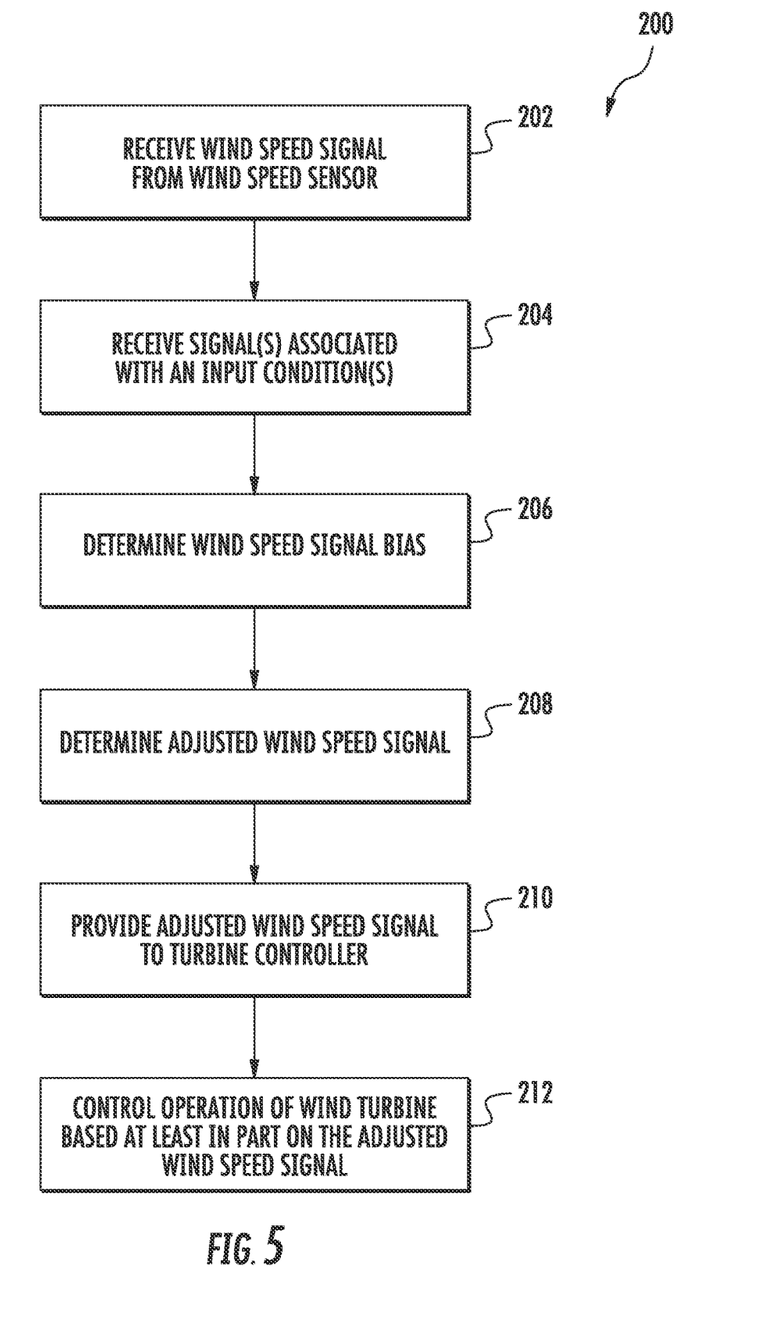
FIG. 5 illustrates a flow diagram of one embodiment of a method for controlling a wind turbine based on adjusted wind speed signals in accordance with aspects of the present subject matter.

Referring now to FIG. 5, a flow diagram of one embodiment of a method 200 for controlling a wind turbine based on adjusted wind speed signals is illustrated in accordance with aspects of the present subject matter. The method 200 may be implemented using one or more control devices, such as one or more of the controllers shown in FIG. 3. In addition, FIG. 5 illustrates steps performed in a particular order for purposes of illustration and discussion. Those of ordinary skill in the art, using the disclosures provided herein, will understand that the steps of any of the methods disclosed herein can be modified, expanded, omitted, rearranged, and/or adapted in various ways without deviating from the scope of the present disclosure.

As shown in FIG. 5, at (202), the method 200 includes receiving a wind speed signal at a secondary controller from a wind speed sensor. For instance, the secondary controller 106 shown in FIG. 3 may receive a wind speed signal indicative of the current wind speed being experienced by the wind turbine 10 from the wind speed sensor(s) 80. Additionally, at (204), one or more signals associated with an input condition(s) may be received. For instance, as indicated above, the secondary controller 106 may receive signals from various other sensors in addition to the wind speed sensor(s) 80, such as the power-related sensor(s) 112 and/or the wind direction sensor 82. The input condition(s) may be a particular level of power output, a particular wind speed, a particular wind direction and/or any combination of such wind turbine parameters. In addition, the input condition(s) may also be based on other suitable parameters without deviating from the scope of the present disclosure.

Moreover, at (206), a wind speed signal bias may be accessed and/or determined. For instance, a wind speed signal bias programmed into the memory device(s) 122 associated with or in communication with the secondary controller 106 may be accessed. In example embodiments, different wind speed signal bias values may be associated with different input conditions. Specifically, in one embodiment, different wind speed signal bias values may be associated with differing wind speed bins. For example, a plurality of wind speed bins may be defined for the wind turbine 10, such as by defining wind speed bins in increments of a pre-set value (e.g., every 1 to 2 m/s). In such an embodiment, each wind speed bin may be associated with a different wind speed signal bias value. In another embodiment, different wind speed signal bias values may be associated with bins or ranges of other suitable input conditions, such as differing power output bins and/or differing wind direction (or yaw angle) bins.

It should be appreciated that the wind speed signal bias value(s) utilized herein may be determined and/or programmed into the secondary controller 106 using any suitable means and/or method known in the art. For instance, in one embodiment, the wind speed signal bias value(s) may correspond to a predetermined signal bias value(s) that is pre-stored within the memory device(s) 122 of the secondary controller 106. Alternatively, the wind speed signal bias value(s) may be determined and/or programmed into the secondary controller 106 using an auto-tuning process. One example of a suitable auto-tuning process that may be utilized in accordance with aspects of the present subject matter will be described below with reference to FIG. 7.

Referring still to FIG. 5, at (208), the method 200 may include determining an adjusted wind speed signal based at least in part on the wind speed signal received from the corresponding sensor and the determined wind speed signal bias. For instance, in one embodiment, the wind speed signal bias associated with the current input condition(s) may be added to or subtracted from the wind speed signal by the secondary controller 106 to determine the adjusted wind speed signal.

Additionally, at (210), the adjusted wind speed signal may be communicated to the turbine controller. For instance, as indicated above, the adjusted wind speed signal may be communicated by the secondary controller 106 over the signal path 116 to the turbine controller 26. Thereafter, at (212), the turbine controller 26 may control the operation of the wind turbine 10 based at least in part on the adjusted wind speed signal.

For instance, in one example implementation, the wind turbine controller 26 may determine a tip speed ratio setpoint based at least in part on the adjusted wind speed signal. The wind turbine controller 26 may then adjust the loading of the rotor blades 22 of the wind turbine 10 based at least in part on the tip speed ratio setpoint. For instance, the wind turbine controller 26 may adjust the pitch angle of one or more of the rotor blades 22 based at least in part on the tip speed ratio setpoint to increase or decrease loading on the blades 22. In addition and/or in the alternative, the wind turbine controller 26 may adjust the torque of the generator 24 to adjust the speed of the rotor blades 22.

Figure 6:
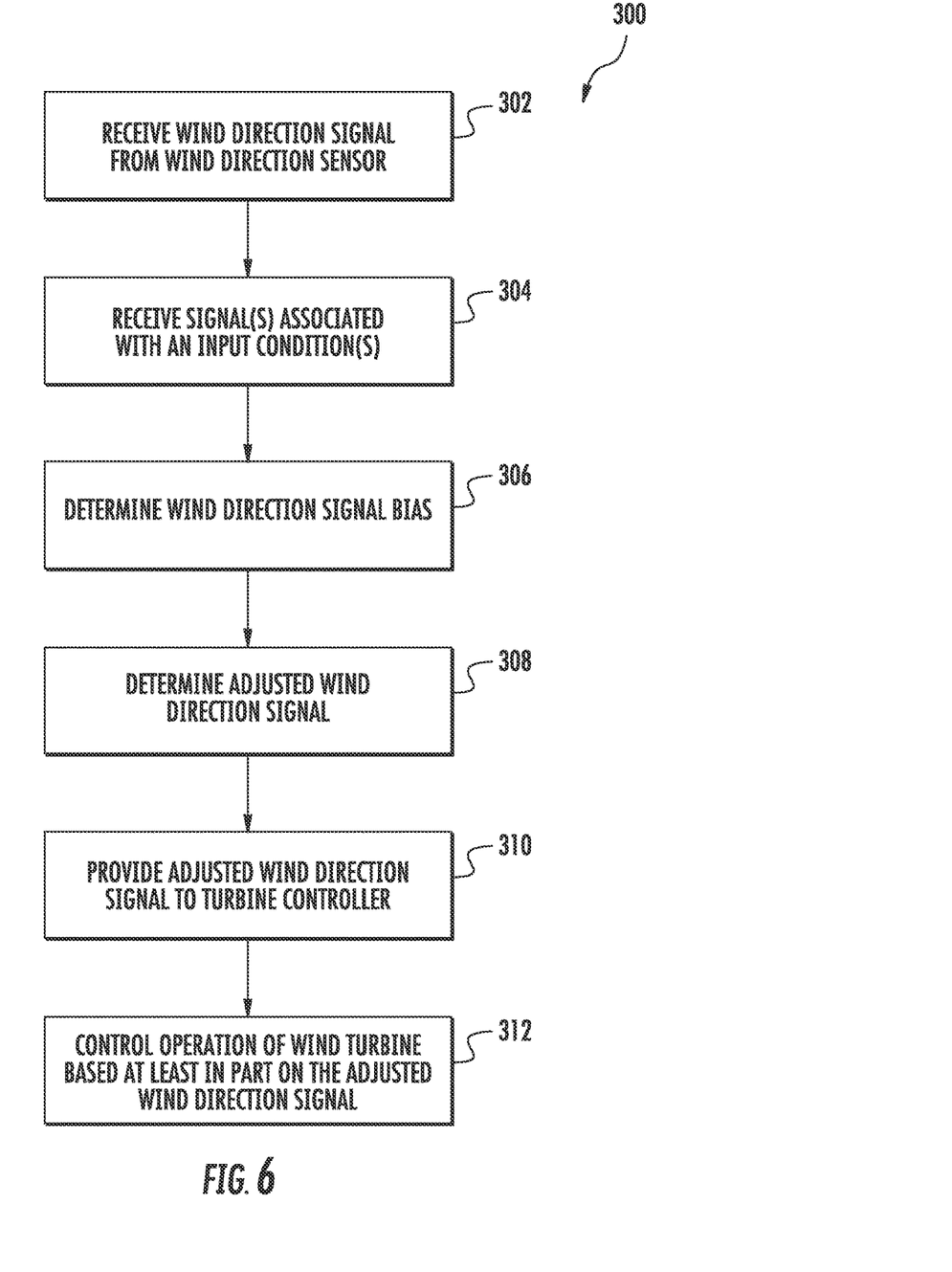
FIG. 6 illustrates a flow diagram of one embodiment of a method for controlling a wind turbine based on adjusted wind direction signals in accordance with aspects of the present subject matter.

Referring now to FIG. 6, a flow diagram of one embodiment of a method 300 for controlling a wind turbine based on adjusted wind direction signals is illustrated in accordance with aspects of the present subject matter. The method 300 may be implemented using one or more control devices, such as one or more of the controllers shown in FIG. 3. In addition, FIG. 6 illustrates steps performed in a particular order for purposes of illustration and discussion. Those of ordinary skill in the art, using the disclosures provided herein, will understand that the steps of any of the methods disclosed herein can be modified, expanded, omitted, rearranged, and/or adapted in various ways without deviating from the scope of the present disclosure.

As shown in FIG. 6, at (302), the method 300 includes receiving a wind direction signal at a secondary controller from a wind direction sensor. For instance, the secondary controller 106 shown in FIG. 3 may receive a wind direction signal indicative of the current wind direction relative to the wind turbine 10 from the wind direction sensor(s) 82. Additionally, at (304), one or more signals associated with an input condition(s) for the wind turbine 10 may be received. For instance, as indicated above, the secondary controller 106 may receive signals from various other sensors in addition to the wind direction sensor(s) 82, such as the power-related sensor(s) 112 and/or the wind speed sensor(s) 82. As indicated above, the input condition(s) may in one embodiment, be a particular level of power output, a particular wind speed, a particular wind direction and/or any combination of such wind turbine parameters.

Moreover, at (306), a wind direction signal bias may be accessed and/or determined. For instance, a wind direction signal bias programmed into the memory device(s) 122 associated with or in communication with the secondary controller 106 may be accessed. In example embodiments, different wind direction signal bias values may be associated with different input conditions. Specifically, in one embodiment, different wind direction signal bias values may be associated with differing wind direction (or yaw angle) bins. For example, a plurality of yaw angle bins may be defined for the wind turbine 10, such as by defining yaw angle bins in increments of a pre-set value (e.g., every 5 to 10 degrees). In such an embodiment, each yaw angle bin may be associated with a different wind direction signal bias. In another embodiment, different wind direction bias values may be associated with bins or ranges of other suitable input conditions, such as differing power output bins and/or differing wind speed bins.

It should be appreciated that the wind direction signal bias value(s) utilized herein may be determined and/or programmed into the secondary controller 106 using any suitable means and/or method known in the art. For instance, in one embodiment, the wind direction signal bias value(s) may correspond to a predetermined signal bias value(s) that is pre-stored within the memory device(s) 122 of the secondary controller 106. Alternatively, the wind direction signal bias value(s) may be determined and/or programmed into the secondary controller 106 using an auto-tuning process. As indicated above, one example of a suitable auto-tuning process that may be utilized in accordance with aspects of the present subject matter will be described below with reference to FIG. 7.

Referring still to FIG. 6, at (308), the method 300 may include determining an adjusted wind direction signal based at least in part on the wind direction signal received from the corresponding sensor and the determined wind direction signal bias. For instance, on one embodiment, the wind direction signal bias associated with the current input condition(s) may be added to or subtracted from the wind direction signal by the secondary controller 106 to determine the adjusted wind direction signal.

Additionally, at (310), the adjusted wind direction signal may be communicated to the turbine controller. For instance, the adjusted wind direction signal may be communicated by the secondary controller 106 over the signal path 116 to the turbine controller 26. Thereafter, at (312), the turbine controller 26 may control the operation of the wind turbine 10 based at least in part on the adjusted wind direction signal.

For instance, in one example implementation, the wind turbine controller 26 may determine a yaw angle setpoint based at least in part on the adjusted wind direction signal. The wind turbine controller 26 may then adjust the orientation of the nacelle 16 relative to the wind based at least in part on the yaw angle setpoint. For instance, as indicated above, the wind turbine controller 26 may adjust the yaw angle of the nacelle 16 via the yaw drive mechanism(s) 38 of the wind turbine 10.

It should be appreciated that, in several embodiments, the methods 200, 300 described herein may be implemented separately to allow the secondary controller 106 to separately determine adjusted wind speed signals or adjusted wind direction signals to be transmitted to the turbine controller. Alternatively, the methods 200, 300 may be implemented in combination (e.g., in parallel). In such an embodiment, the second controller 106 may determine both an adjusted wind speed signal and an adjusted wind direction signal based on the associated input condition(s). The adjusted wind speed/direction signals may then be transmitted to the turbine controller 26 to allow appropriate control actions to be implemented based on the adjusted signals.

Figure 7:
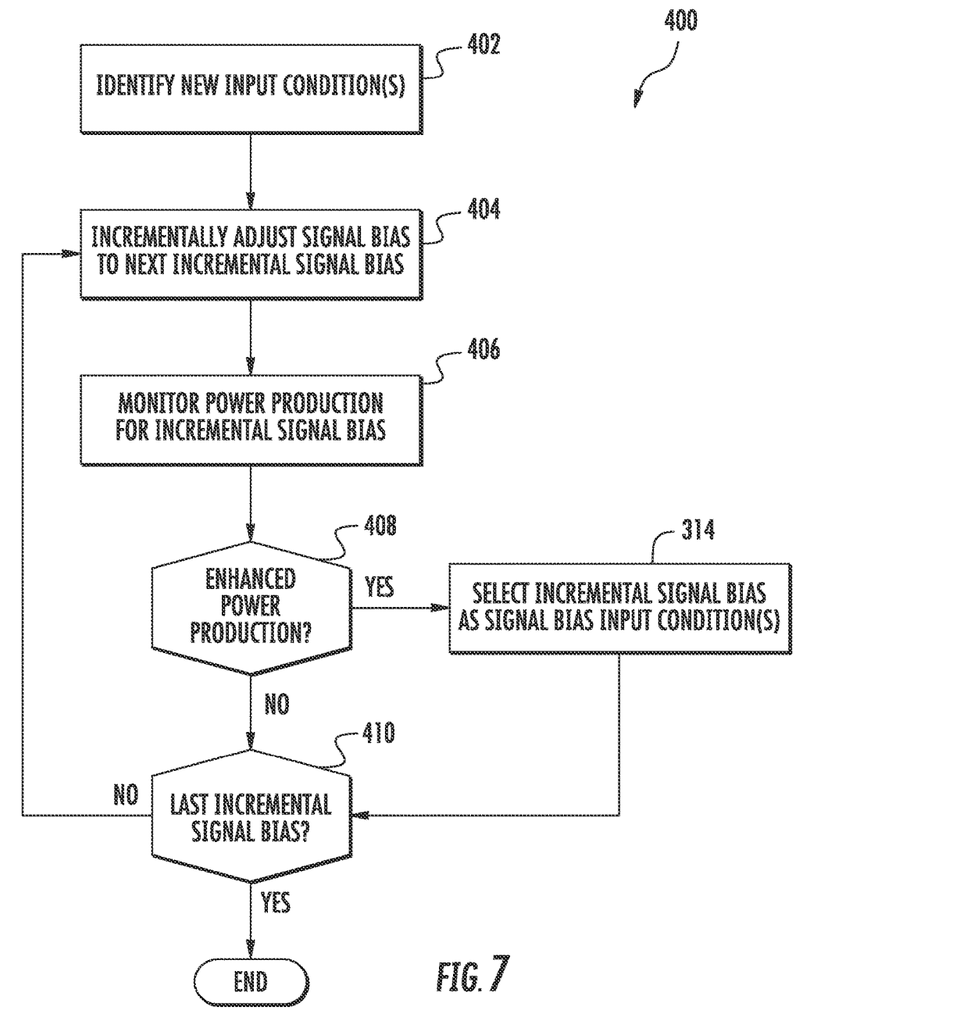
FIG. 7 illustrates a flow diagram of one embodiment of an auto-tuning process for determining a signal bias for a secondary controller in accordance with aspects of the present subject matter.

As indicated above, in several embodiments, the signal bias value(s) utilized herein may be programmed into the secondary controller 106 using an auto-tuning process. For example, FIG. 7 illustrates a flow diagram of one example of an auto-tuning process 400 that may be utilized to determine signal bias values (e.g., wind speed signal bias values and/or wind direction signal bias values) in accordance with aspects of the present subject matter. The auto-tuning process 400 may be performed at any suitable time, such as when the secondary controller 106 is first implemented in the control system 100 and/or at periodic intervals. Generally, the auto-tuning process 400 includes incrementally adjusting the signal bias among a plurality of incremental signal bias values. It should be appreciated that any suitable number of incremental signal bias values may be used without deviating from the scope of the present disclosure. When adjusting the signal bias, the power production or output of the wind turbine 10 may be monitored at each of the plurality of different incremental signal bias values. The signal bias value for the current or relevant input condition(s) of the wind turbine 10 may be selected based at least in part on the power production associated with each incremental signal bias value such that the incremental signal bias value associated with the most improved and/or enhanced power production is selected as the signal bias value for the current/relevant input condition(s).

As shown in FIG. 7, at (402), a new input condition(s) of the wind turbine may be identified. For instance, based on signals received from one or more sensors, the secondary controller 106 may identify that a new input condition(s) is present. Specifically, in one embodiment, the secondary controller 106 may receive a wind speed signal from the wind speed sensor 80 and recognize that the wind speed associated with the wind speed signal falls into a wind speed bin for which a wind speed signal bias has not yet been assigned. In such instance, the secondary controller 106 may identify the wind speed and/or the wind speed bin as the new input condition(s). Similarly, the secondary controller 106 may receive a wind direction signal from the wind direction sensor 82 and recognize that the wind direction associated with the wind direction signal falls into a wind direction (or yaw angle) bin for which a wind direction signal bias has not yet been assigned. In such instance, the secondary controller 106 may identify the wind direction and/or the wind direction (or yaw angle) bin as the new input condition(s).

Additionally, at (404), the auto-tuning process 400 may include incrementally adjusting the signal bias value to a next incremental signal bias value. For instance, when determining a wind speed signal bias, the initial signal bias value may be adjusted by a plurality of incremental wind speed signal bias values (e.g. ±0.1 m/s, ±0.2 m/s, ±0.3 m/s, ±0.4 m/s, ±0.5 m/s, etc.). Similarly, when determining a wind direction signal bias, the initial signal bias value may be adjusted by a plurality of incremental wind direction signal bias values (e.g. ±0.5°, ±1.0°, ±1.5°, ±2.0°, ±2.5°, etc.).

After adjusting the signal bias value to the next incremental signal bias value, the auto-tuning process 400 proceeds to (406), where the power production at the incremental signal bias is monitored. As a result, at (408), it may be determined whether the power production at the incremental signal bias is improved or enhanced. If not, it may then be determined, at (410), whether the incremental signal bias is the last signal bias in the plurality of incremental signal bias values. If so, the process 400 terminates. Otherwise, the auto-tuning process 400 returns to (404) where the signal bias is incrementally adjusted to the next incremental signal bias value.

If the power production is improved or enhanced at (408), the incremental signal bias is selected, at (412) as the signal bias for the input condition(s). It is then determined, at (410), whether the incremental signal bias is the last incremental signal bias in the plurality of incremental signal bias values. If so, the process 400 terminates. Otherwise, the process 400 returns to (404), where the signal bias is incrementally adjusted to the next incremental signal bias value. This process 400 repeats itself until all incremental signal bias values in the plurality of incremental signal bias values have been tested.

It should be appreciated that, in several embodiments, the auto-tuning process 400 shown in FIG. 7 may be implemented separately to determine signal bias values for both the wind speed and the wind direction. Alternatively, the signal bias values associated with the wind speed and the wind direction may be run through auto-tuning process 400 together or in combination. Such a combined process may allow for differing pairs of wind speed and wind direction signal bias values to be tested to determine which pair(s) provides for the most improved or enhanced power production.

It should also be appreciated that FIG. 7 simply illustrates one example of a suitable process/method for programming a signal bias into the secondary controller 106 according to aspects of the present subject matter. Other suitable processes/methods may be used without deviating from the scope of the present subject matter. For instance, as indicated above, the signal bias values may be manually programmed into the secondary controller 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling a wind turbine, comprising:
at least one sensor configured to provide a wind speed signal indicative of a wind speed experienced by the wind turbine;
a turbine controller configured to control the operation of the wind turbine;
a secondary controller inserted between the at least one sensor and the turbine controller, the secondary controller separated from the turbine controller by a distance, the secondary controller configured to receive the wind speed signal from the at least one sensor over a communication interface,
wherein the secondary controller is configured to adjust the wind speed signal based at least in part on a signal bias to an adjusted wind speed signal and to provide the adjusted wind speed signal to the turbine controller,
wherein the turbine controller actively controls the operation of the wind turbine based at least in part on the adjusted wind speed signal received from the secondary controller.

2. The system of claim 1, wherein the secondary controller is configured to adjust the wind speed signal without accessing computer-readable instructions implemented by the turbine controller.

3. The system of claim 1, wherein the secondary controller is configured to provide the adjusted wind speed signal to the turbine controller via a signal path extending between the secondary controller and the turbine controller.

4. The system of claim 1, wherein the turbine controller is configured to actively control the operation of the wind turbine by adjusting a pitch angle of one or more rotor blades of the wind turbine or adjusting a generator torque of the wind turbine based at least in part on the adjusted wind speed signal.

5. The system of claim 1, wherein the at least one sensor is further configured to provide a wind direction signal indicative of a wind direction relative to the wind turbine, the secondary controller being configured to receive the wind direction signal from the at least one sensor,
wherein the secondary controller is configured to adjust the wind direction signal based at least in part on a second signal bias to an adjusted wind direction signal and to provide the adjusted wind direction signal to the turbine controller.

6. The system of claim 1, wherein the secondary controller comprises an interface configured to receive input signals associated with the wind speed and a power production of the wind turbine, the secondary controller being configured to determine the signal bias based at least in part on the wind speed and the power production.

7. The system of claim 1, wherein the secondary controller is configured to determine a different signal bias for a plurality of different wind speed bins defined for the wind turbine.

8. A system for controlling a wind turbine, comprising:
at least one sensor configured to provide a wind direction signal indicative of a wind direction relative to the wind turbine;
a turbine controller configured to control the operation of the wind turbine;
a secondary controller inserted between the at least one sensor and the turbine controller, the secondary controller separated from the turbine controller by a distance, the secondary controller configured to receive the wind direction signal from the at least one sensor over a communication interface,
wherein the secondary controller is configured to adjust the wind direction signal based at least in part on a signal bias to an adjusted wind direction signal and to provide the adjusted wind direction signal to the turbine controller,
wherein the turbine controller actively controls the operation of the wind turbine based at least in part on the adjusted wind direction signal received from the secondary controller.

9. The system of claim 8, wherein the secondary controller is configured to adjust the wind direction signal without accessing computer-readable instructions implemented by the turbine controller.

10. The system of claim 8, wherein the secondary controller is configured to provide the adjusted wind direction signal to the turbine controller via a signal path extending between the secondary controller and the turbine controller.

11. The system of claim 8, wherein the turbine controller is configured to actively control the operation of the wind turbine by adjusting an orientation of a nacelle of the wind turbine relative to the wind direction based at least in part on the adjusted wind direction signal.

12. The system of claim 8, wherein the at least one sensor is further configured to provide a wind speed signal indicative of a wind speed experienced by the wind turbine, the secondary controller being configured to receive the wind speed signal from the at least one sensor,
wherein the secondary controller is configured to adjust the wind speed signal based at least in part on a second signal bias to an adjusted wind speed signal and to provide the adjusted wind speed signal to the turbine controller.

13. The system of claim 8, wherein the secondary controller comprises an interface configured to receive input signals associated with the wind speed and a power production of the wind turbine, the secondary controller being configured to determine the signal bias based at least in part on the wind speed and the power production.

14. The system of claim 8, wherein the secondary controller is configured to determine a different signal bias for a plurality of different yaw angle bins defined for the wind turbine.

15. A method for controlling a wind turbine, the wind turbine comprising first and second sensors in communication with a wind turbine controller over a signal path, the method comprising:
- operating a wind turbine having a secondary controller communicatively coupled between the wind turbine controller and the first and second sensors along the signal path;
- generating a wind speed signal indicative of a wind speed experienced by the wind turbine with the first sensor;
- generating a wind direction signal indicative of a wind direction relative to the wind turbine with the second sensor;
- determining, at the secondary controller, an adjusted wind speed signal that is different from the wind speed signal based at least in part on a first signal bias;
- determining, at the secondary controller, an adjusted wind direction signal that is different from the wind direction signal based at least in part on a second signal bias;
- providing the adjusted wind speed and wind direction signals to the wind turbine controller; and
- actively controlling the operation of the wind turbine based at least in part on at least one of the adjusted wind speed signal or the adjusted wind direction signal.

16. The method of claim 15, further comprising determining, by the wind turbine controller, a tip speed ratio setpoint for the wind turbine based at least in part on the adjusted wind speed signal.

17. The method of claim 16, wherein actively controlling the operation of the wind turbine comprises adjusting a pitch angle associated with the one or more rotor blades based on the tip speed ratio setpoint.

18. The method of claim 15, further comprising determining, by the wind turbine controller, a yaw angle setpoint for the wind turbine based at least in part on the adjusted wind direction signal.

19. The method of claim 18, wherein actively controlling the operation of the wind turbine comprises adjusting an orientation of a nacelle of the wind turbine relative to the direction of the wind based on the yaw angle setpoint.

20. The method of claim 15, wherein at least one of the first signal bias or the second signal bias is programmed into the secondary controller using an auto-tuning process, the auto-tuning process comprising:
- for each of a plurality of input conditions, incrementally adjusting the at least one of the first signal bias or the second signal bias among a plurality of incremental signal bias values;
- monitoring power production of the wind turbine at each of the plurality of incremental signal bias values; and
- selecting the at least one of the first signal bias or the second signal bias from the plurality of incremental signal bias values based at least in part on the power production associated with each of the plurality of incremental signal bias values.

* * * * *